United States Patent
Spreafico

(10) Patent No.: US 6,759,593 B2
(45) Date of Patent: Jul. 6, 2004

(54) SUPERCONDUCTING CABLE

(75) Inventor: Sergio Spreafico, Erba (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 7 days.

(21) Appl. No.: 09/987,355

(22) Filed: Nov. 14, 2001

(65) Prior Publication Data

US 2003/0019660 A1 Jan. 30, 2003

Related U.S. Application Data

(60) Provisional application No. 60/249,463, filed on Nov. 20, 2000.

(30) Foreign Application Priority Data

Nov. 14, 2000 (EP) ............................................. 00124788

(51) Int. Cl.[7] ............................................. H01B 12/00
(52) U.S. Cl. ........................ 174/125.1; 29/599; 505/230
(58) Field of Search ............................. 174/125.1, 15.4, 174/15.5; 505/230, 231, 232, 233, 234, 235, 236, 237, 238; 29/599

(56) References Cited

U.S. PATENT DOCUMENTS

| | | | | |
|---|---|---|---|---|
| 3,612,742 A | * | 10/1971 | Snowden et al. ............ | 174/15.5 |
| 3,730,966 A | * | 5/1973 | Auploix et al. ............ | 174/15.5 |
| 4,184,042 A | * | 1/1980 | Vulis et al. ................ | 174/15.5 |
| 5,932,523 A | * | 8/1999 | Fujikami et al. ............ | 505/231 |
| 5,952,614 A | * | 9/1999 | Ries ....................... | 174/106 R |
| 6,034,588 A | * | 3/2000 | Ando et al. ................ | 335/216 |

FOREIGN PATENT DOCUMENTS

| | | |
|---|---|---|
| DE | 3811051 A1 | 10/1989 |
| JP | 356040289 A * | 4/1981 |
| WO | WO96/41352 | 12/1996 |

OTHER PUBLICATIONS

J.S. Engelhardt et al., "Application Considerations for HTSC Power Transmission Cables", Fifth Annual Conference on Superconductivity and Applications, pp. 1–20, (1991).

* cited by examiner

Primary Examiner—David A. Zarneke
Assistant Examiner—I B Patel
(74) Attorney, Agent, or Firm—Finnegan, Henderson, Farabow, Garrett & Dunner, L.L.P.

(57) ABSTRACT

A superconducting cable includes at least one layer of tapes of superconducting material circumferentially wound side by side on a support at a prefixed distance forming gaps circumferentially among adjacent tapes. Within the superconducting cable, a non-superconducting material is interposed between adjacent tapes to partially fill the gaps.

11 Claims, 4 Drawing Sheets

SUPERCONDUCTING CABLE

RELATED APPLICATIONS

Under provisions of 35 U.S.C. §119, Applicant claims the benefit of European Patent Application No. 00124788.1, filed Nov. 14, 2000, and U.S. provisional patent application Ser. No. 60/249,463, filed Nov. 20, 2000.

TECHNICAL FIELD

The present invention relates, in its more general aspect, to a superconducting cable having at least one superconducting layer.

BACKGROUND

The term "superconducting cable" indicates an electrical transmission cable comprising at least an element of superconducting material.

The superconducting cable of the present invention may be a warm dielectric (WD) or cold dielectric (CD) cable. See, for example, Engelhardt J. S. et al., Application Consideration for HTSC Power Transmission Cable, 5th Annual Conference on Superconductivity and Application, Buffalo, N.Y., Sep. 24–26, 1991, FIG. 5 for a WD cable, and FIG. 6 for a CD cable.

A WD cable generally comprises one or more layers of tapes of superconducting material wound on a support, typically tubular, defining the cryogen fluid flow channel. Externally to the superconducting tapes a cryostat and an electric insulator are provided.

A CD cable generally comprises, in addition to the layers mentioned above for the WD cable, further layer(s) constituting the so-called return conductor and wound externally to the electric insulator and surrounded by a wall partially defining a second cryogen fluid flow channel.

The term "superconducting material" indicates a material, such as for example, special niobium-titanium alloys or ceramics based on mixed oxides of copper, barium and yttrium (YBCO) or gadolinium, samarium or other rare earth (REBCO), or of bismuth (BSCCO), or thallium and mercury, and lead, strontium, calcium, copper, comprising a superconducting phase having a substantially null resistivity below a given temperature, defined as critical temperature or $T_c$.

The operative temperature of a superconducting cable is equal or, preferably, lower than the $T_c$ of the superconducting material present therein.

Usually the superconducting material, particularly the BSCCO material, is produced and used in form of tapes wherein the material is surrounded by a metal, generally silver optionally added with aluminium or magnesium, and preferably reinforced by a further layer of metal, for example stainless steel.

The tapes are usually helicoidally wound around a support, parallel each other, at a prefixed distance so as to form gaps among the tapes of each layer. The tapes are not wound in contact one another.

The term "superconducting conductor" indicates the electrically active portion of a superconducting cable, comprising a support and at least one layer of superconducting material.

The term "superconducting layer" indicates a layer of tapes of superconducting material wound around a support or around another superconducting layer or around a dielectric, this latter being the case of the CD cable. One or more layers of tapes of superconducting material may constitute a phase conductor or, in the case of a cold dielectric cable, a return conductor.

The Applicant has found that high gaps among tapes of superconducting material may produce damages to the tapes due to the pressure exerted on the tapes by the parts surrounding them and to the friction among the various components during the manufacturing and handling of the cable. Some kind of cables shows superconducting conductors with a restricted number of tapes per layer with respect to the circumference of their support. It is the case, for example, of a 3-tape conductor wherein the tapes are in wye configuration. Especially in the case of a CD cable, the pressure due to the weight of the cable itself is significant in view of the small area of the tape, of their structural fragility and of the sensitivity of the superconducting material contained therein. The problem is particularly evident at the contact points among tapes of two adjacent layers. Another instance regards the return conductor of a CD cable, which has to have the same current capacity (also known as ampacity) of the phase conductor. The most simple and economic way for attaining this goal is to use the same number of tapes per layer of the phase conductor. In view of the greater diameter of the return conductor (twice that of the phase conductor), the distance (gap) among the tapes of the same layer of this conductor is remarkably higher. For example, in a phase conductor having a diameter of 32 mm and 14 5-mm wide tapes per layer wound thereupon, the gap among the tapes is 2.14 mm wide for the first layer. The return conductor of said phase conductor, and the same number of 5-mm wide tapes per layer, has a diameter of 64 mm and the gap among the tapes is 9.35 mm wide for the first layer.

SUMMARY OF A FEW ASPECTS OF THE INVENTION

It has now been found that by partially filling the gaps among the tapes of superconducting material with a non-superconducting material mechanical damages to the tapes are avoided.

Therefore in a first aspect the present invention relates to a superconducting cable comprising at least one layer of tapes of superconducting material wound on a support at a prefixed distance so as gaps are formed among adjacent tapes, wherein a non-superconducting material is interposed between adjacent tapes to partially fill said gaps.

Preferably, the superconducting cable according to the invention is a cold dielectric cable comprising a phase conductor including at least a first layer of tapes of superconducting material wound on a support at a prefixed distance so as gaps are formed among adjacent tapes, and a return conductor including at least a second layer of tapes of superconducting material, as return conductor wound on a support at a prefixed distance so as gaps are formed among adjacent tapes, wherein the non-superconducting material is present at least among the tapes of superconducting material of the return conductor.

Specifically the non-superconducting material is in form of wires or, preferably, of tapes.

The non-superconducting material has preferably a thickness differing from that of the tapes of the superconducting material of an amount not higher than +/−15%, more preferably than +/−10%, even more preferably than +/−5%. Preferably the thickness of the non-superconducting material is substantially equal to that of the tapes of superconducting material.

The non-superconducting material partially fills the gaps among the tapes of superconducting material. The necessity of maintaining a gap, even if reduced among tapes of superconducting material and non-superconducting material is due both to the head for HTS-tape laying employed for the deposition of the tapes, and the necessity of avoiding friction among the tapes and of undesirable electromagnetical phenomena. Specifically the width of the non-superconducting material is such that a gap of 0.1–3 mm remains between a tape of superconducting material and the adjacent tape or wire of non-superconducting material, more preferably of 0.1–2 mm.

The non-superconducting material may be a plastic, a metal or a combination thereof. When it is totally or partially metallic, the metal has amagnetic characteristics at the operative temperature of the cable. Preferred metals according to the invention are copper, silver and gold.

When the non-superconducting material is copper or silver or gold or alloys thereof, it shows the additional advantages of protecting the superconducting material against overcurrents generated in short-circuit events. A preferred metal according to the invention is copper.

The non-superconducting material is preferably longitudinally wound on the support or on the underlying superconducting layer, and alternated with the tapes of superconducting material.

A further aspect of the present invention relates to a method for minimizing mechanical stresses to tapes of superconducting material wound on a support at a prefixed distance so as gaps are formed among adjacent tapes, comprising the phase of interposing a non-superconducting material between adjacent tapes to partially fill said gaps.

In a further aspect, the present invention relates to a method for producing a superconducting conductor comprising at least one layer of superconducting tapes wound on a support at a prefixed distance so as gaps are formed among the tapes, wherein a non-superconducting material is interposed between adjacent tapes to partially fill said gaps.

Another further aspect of the present invention relates to current transmission/distribution network comprising at least one superconducting cable comprising at least one layer of tapes of superconducting material wound on a support at a prefixed distance such as gaps are formed among the tapes, wherein a non-superconducting material is interposed between adjacent tapes to partially fill said gaps.

DESCRIPTION OF VARIOUS EMBODIMENTS

Figure 1:
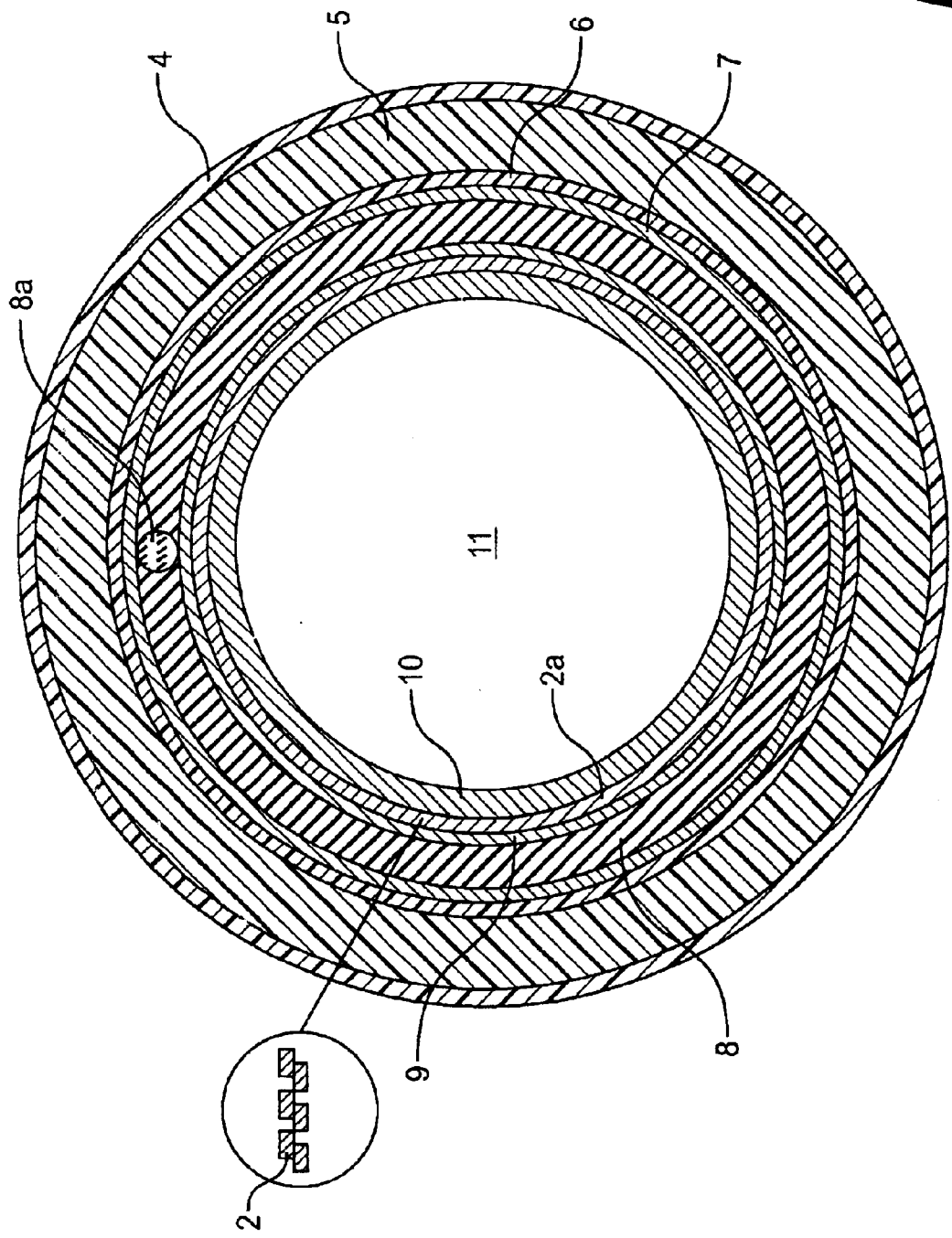
FIG. 1 shows a transversal section of a WD superconducting cable.

FIG. 1 shows a WD superconducting cable according to the present invention. The phase conductor (2a) comprises a plurality of superconducting tapes (2) wound on a support (10). The inner surface of the support (10) defines channel (11) wherein a cryogenic fluid flows.

For reducing as much as possible accidental mechanical internal stresses, the superconducting tapes (2) are preferably wound on the support (10) with winding angles comprised between 10° and 60°, such angles being constant or variable for each-layer.

The phase conductor (2a) may be in direct contact with the support (10) or, alternatively, a layer of carbon black crepe paper may be interposed between phase conductor (2a) and support (10) for minimising mechanical stress among the tapes.

The conductor phase (2a) is thermally insulated by means of a cryostat coaxial to the conductor phase and comprising a first metal tube (9), a second metal tube (7), and a thermal insulation (8) interposed between said first and second tubes.

The metal tubes (9) and (7) are preferably made of a 0.6-mm thick stainless steel tape, more preferably corrugated.

The thermal insulation (8) consists, for example, of surface-metallized polyester resin tapes, known as "thermal superinsulation", loosely wound, possibly interposing spacers (8a) for spacing the metal tubes (9) and (7).

Preferably, such spacers (8a) are placed at 120° each other with respect to the cable section. They are preferably made of polytetrafluoroethylene.

At the moment of operating the cable, a vacuum of, typically, $10^{-6}$ bar is created in the thermal insulation by means of a vacuum apparatus.

A first electrostatic shield (6), an electric insulation (5) and a second electrostatic shield (4) are set externally to the cryostat. Said shields (6) and (4) and the insulation (5) may be lapped or extruded.

In case of lapped electrostatic shields, they may consist of insulating oil-impregnated tapes of various materials such as, for example, smooth or crepe carbon paper and metallized carbon.

In case of a lapped electric insulation, it may consist of a plurality of layers made of, for example, paper tapes and/or paper with film-calendered polypropylene tapes.

Alternatively, the electrostatic shields (6) and (4) and the electric insulation layer (5) may be obtained by extruding and cross-linking ethylene-propylene rubber (EPR) or polyethylene (XLPE).

In addition, the WD superconducting cable comprises an external metallic shield (not illustrated) made, for example, of copper tapes and in contact with the second electrostatic shield (4). This external metallic shield is earth connected so as its electric potential and that of the shield (4) are null.

Other protecting layer(s) (not illustrated) may be externally provided for minimising any kind of stress for the cable during the installation.

Figure 2:
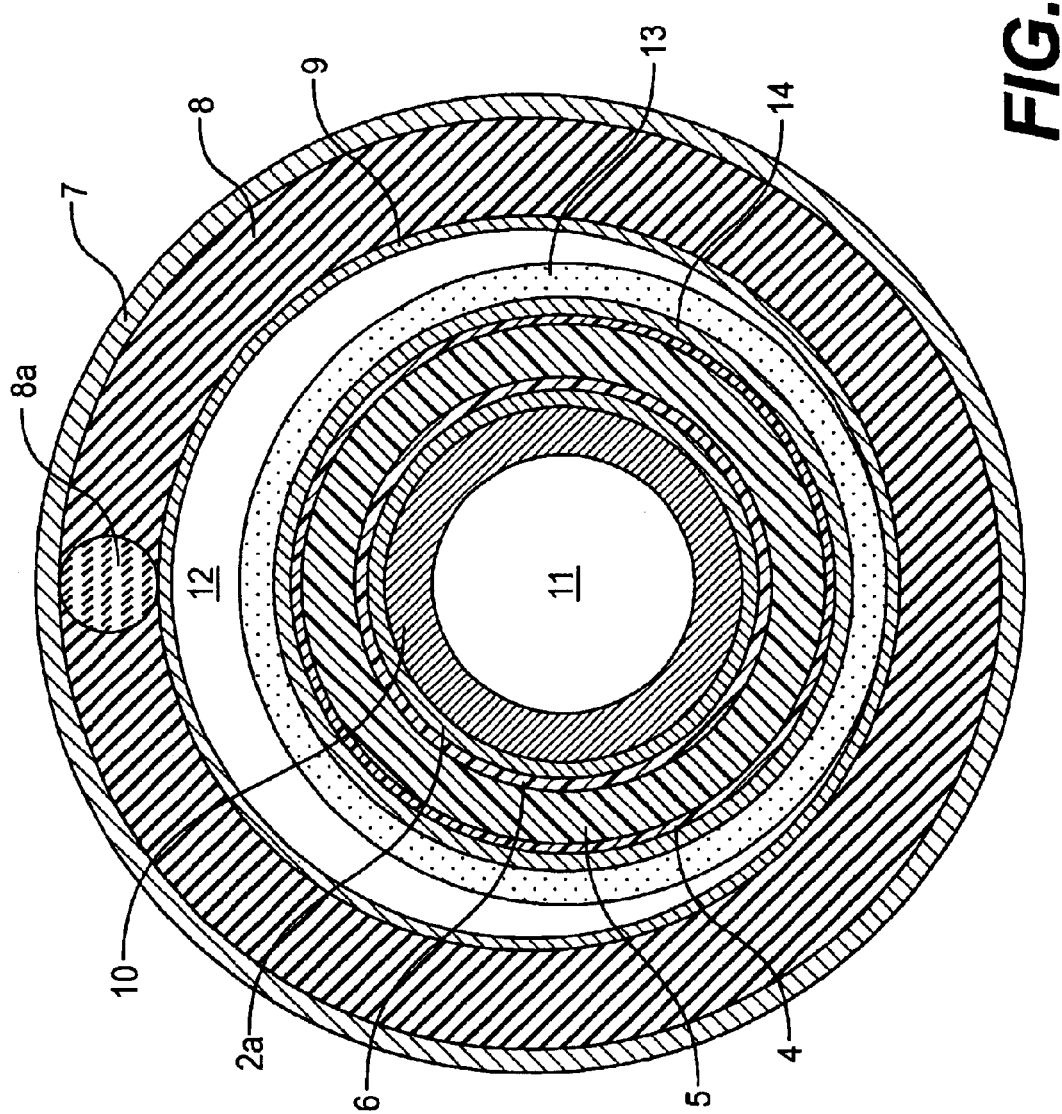
FIG. 2 shows a transversal section of a CD superconducting cable.

FIG. 2 shows a CD superconducting cable according to the invention. It comprises a phase conductor (2a) consisting of a plurality of superconducting tapes (not specifically illustrated herein) wound on a support (10) defining, in turn, a channel (11) for the cryogenic fluid flow.

The phase conductor (2a) is in contact with an electric insulation consisting of a first electrostatic shield (6), a second electrostatic shield (4) and an electric insulation (5) disposed in between.

The insulation (5) is made of very thin (about 5 $\mu$m) polypropylene tape layers. This kind of insulation does not require any impregnation. Alternatively, the insulation may be made as described above for a WD superconducting cable.

The CD superconducting cable shows a return conductor (14) consisting of superconducting tapes wound on the second electrostatic shield (4). This return conductor (14) is surrounded by a layer (13) having a composition similar to that of support (10).

Externally to the layer (13) a cryostat is provided including a first metal tube (9), a thermal insulation (8) and a second metal tube (7).

The outside surface of the layer (13) and the inner surface of the first metal tube (9) define a channel (12) for the cryogenic fluid cooling the return conductor (14).

This cable is provided with an external protecting sheath (not illustrated), for example of polyethylene.

The cryogenic fluid may flow along the channel (11) in a direction and along channel (12) in the same or opposite direction.

Figure 3:
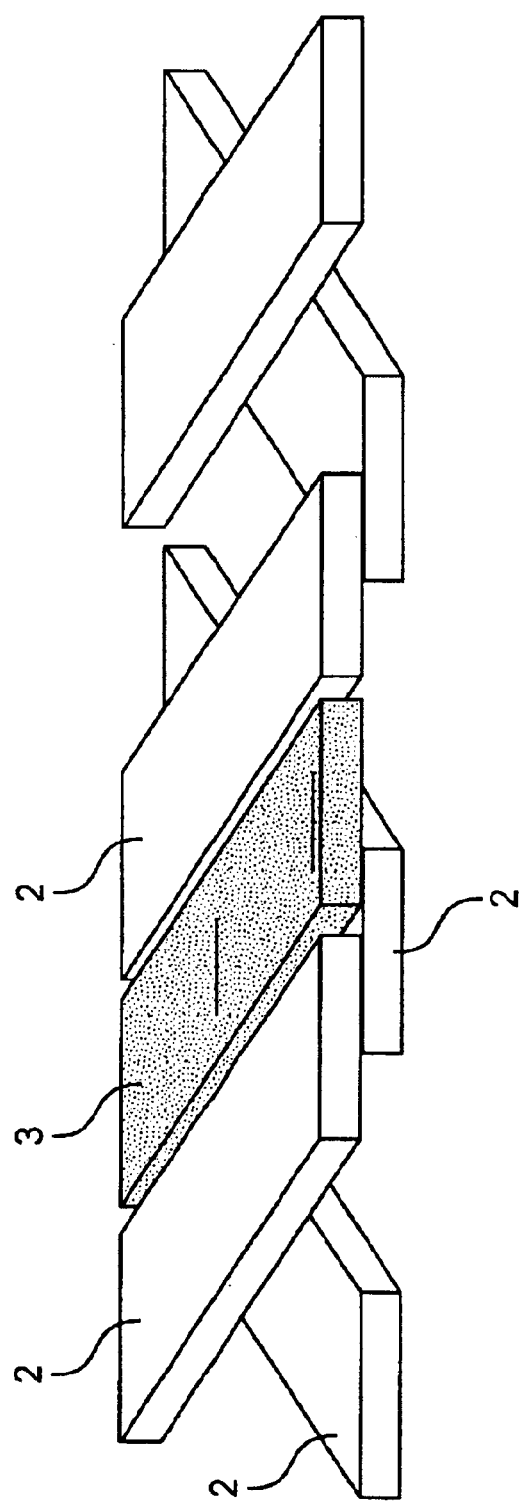
FIG. 3 schematically illustrates two layers of superconducting tapes wherein one of the gaps is partially filled with a tape of non-superconducting material.

FIG. 3 illustrates a schematical view of two layers of tapes of superconducting material with and without the filling non-superconducting material according to the present invention. In this case the superconducting tapes (2) are disposed in two layers with diverging direction. A tape of non-superconducting material (3) is disposed between two tapes (2) of the upper layer. Other tapes of non-superconducting material (not illustrated) may be present in the gaps among the other tapes.

The present invention will be now better illustrated by the following non limitative example.

EXAMPLE 1

Two cold dielectric superconducting cables, 15 m long respectively, were made by assembling:

- a tubular former
- a phase conductor consisting of 2 layers of tapes of superconducting material helicoidally wound with opposite direction each other
- a lapped dielectric
- a return conductor consisting of 2 layers of tapes of superconducting material helicoidally wound with opposite direction each other The tapes of superconducting material employed were 4.1 mm wide and 0.3 mm thick.

The phase conductor was made by winding two layers of 24 tapes each on a tubular former having an external diameter of 46 mm. The tapes were helicoidally wound with an angle of, respectively, about 30° and about −30°. The gap between two tapes was of about 0.8 mm.

The return conductor was made by winding 2 layers of 24 tapes each on the dielectric insulator having an external diameter of 85.20 mm.

Figure 4:
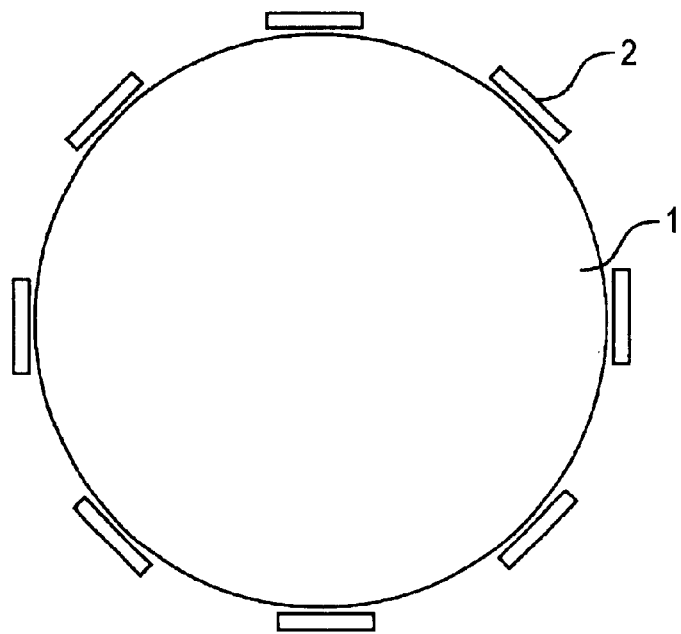
FIG. 4 shows a transversal section of the $1^{st}$ layer of the return conductor of a CD cable according to the prior art.

In the cable according to the prior art (cable 1) the tapes of superconducting material of the return conductor were helicoidally wound with an angle of, respectively, about 30° and about −30°, and the gap between two tapes resulted to be of about 5.5 mm. This configuration is schematically depicted in FIG. 4 wherein (1) is the tubular former and (2) are the tapes of superconducting material.

Figure 5:
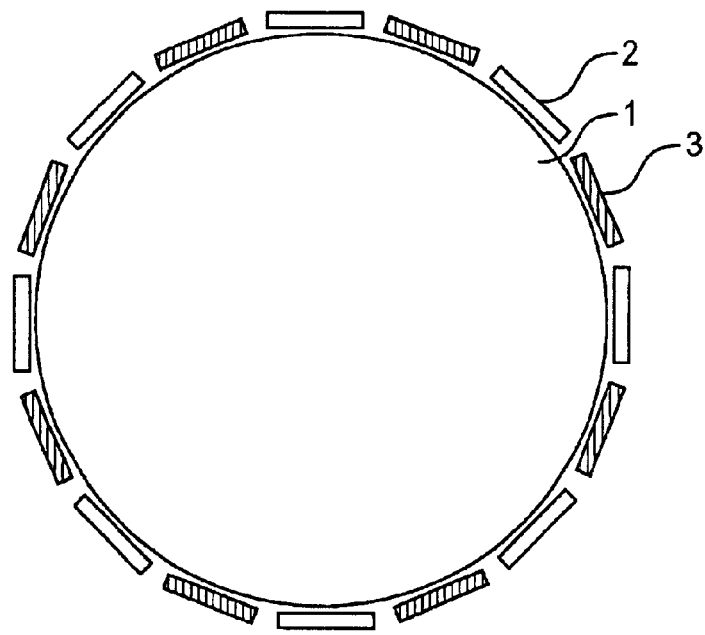
FIG. 5 shows a transversal section of the $1^{st}$ layer of the return conductor of a CD cable according to the present invention.

In the cable according to the present invention (cable 2) the tapes of superconducting material of the return conductor were helicoidally wound as in cable 1. Copper tapes 4 mm wide and 0.300 mm thick were positioned by alternately winding to the tapes of superconducting material such that the gap between a tape of superconducting material and the adjacent copper tape was of 0.75 mm. This configuration is depicted in FIG. 5 wherein (1) is the tubular former, (2) are the tapes of superconducting material and (3) are the tapes of copper (filling non-superconducting) material.

The cables were thrice bent on a bobbin drum having a 3-m diameter, then they were visually inspected, and the critical current (Ic) of the tapes of superconducting material of the return conductor was measured by the electrical transport 4 probe technique determining the voltage at 1 $\mu$V/cm $E_c$.

By measuring the critical current of a tape it is possible to assess a possible degradation of the current transport properties of the superconducting tape.

In the following table 1 the results of the critical current test after folding are set forth. The $1^{st}$ layer is the internal and the $2^{nd}$ the external one.

TABLE 1

Critical current (Ic) measurement on a superconducting tape of the return conductor

|  | Ic of the tape before being wound in the cable | | Ic of the tape after thrice folding the cable on a 3-m diameter drum | | Ic variation (%) | |
| --- | --- | --- | --- | --- | --- | --- |
|  | $1^{st}$ layer | $2^{nd}$ layer | $1^{st}$ layer | $2^{nd}$ layer | $1^{st}$ layer | $2^{nd}$ layer |
| Cable 1 | 112A | 125A | 54A | 78A | 48% | 63% |
| Cable 2 | 112A | 125A | 112A | 123A | 100% | 99% |

The visual inspection of the tapes of superconducting material of the return conductor of cable 1 revealed a local damage of the tapes in the following positions:

1) lower portion of return conductor contacting a) carry-over rolls and b) capstan during the conductor manufacturing and c) the bobbin drum during transportation.

2) contact points of the $2^{nd}$ and the $1^{st}$ layers of tapes.

What is claimed is:

1. A superconducting cable comprising at least one layer of tapes of superconducting material circumferentially wound side by side on a support at a prefixed distance so that gaps are circumferentially formed between adjacent tapes, wherein a non-superconducting material is interposed between the adjacent tapes to partially fill the gaps and configured to allow a space in the gaps, the non-superconducting material having a thickness differing from that of the tapes of the superconducting material of an amount not higher than one of +/−15%.

2. The superconducting cable according to claim 1 wherein the non-superconducting material comprises at least one of tapes and wires.

3. The superconducting cable according to claim 1 wherein the non-superconducting material has a thickness substantially equal to that of the tapes of the superconducting material.

4. The superconducting cable according to claim 1 wherein the width of the non-superconducting material is such that a gap of one of 0.1–3 mm and 0.1–2 mm remains between one tape of superconducting material and the adjacent non-superconducting material.

5. The superconducting cable according to claim 1 wherein the non-superconducting material comprises at least one of plastic and metal.

6. The superconducting cable according to claim 5 wherein the non-superconducting material has amagnetic characteristics at an operative temperature.

7. The superconducting cable according to claim 5 wherein the metal comprises at least one of copper, silver, gold, copper alloy, silver alloy, and gold alloy.

8. The superconducting cable according to claim 1 wherein the non-superconducting material is longitudinally wound on the support or on an underlying superconducting layer, and alternated with the tapes of superconducting material.

9. The superconducting cable according to claim 1 wherein the superconducting cable is disposed within at least one of a current transmission network and a current distribution network.

10. A superconducting cable comprising:
    a phase conductor including at least a first layer of tapes of superconducting material circumferentially wound side by side on a support at a first prefixed distance so that first gaps are circumferentially formed between adjacent tapes of the phase conductor wherein a non-superconducting material is interposed between the adjacent tapes to partially fill the first gaps and configured to allow a space in the first gaps, the non-superconducting material having a thickness differing from that of the first layer of tapes of the superconducting material of an amount not higher than one of +/−15%; and
    a return conductor including at least a second layer of tapes of superconducting material circumferentially wound on a support side by side at a second prefixed distance so that second gaps are circumferentially formed between adjacent tapes of the return conductor.

11. The superconducting cable according to claim 10 wherein a non-superconducting material is present among at least one of the tapes of superconducting material and the tapes of the return conductor.

* * * * *